United States Patent Office 2,831,035
Patented Apr. 15, 1958

2,831,035
MANUFACTURE OF FLUOROCARBONS

Edward A. Tyczkowski, Rockaway, and Cyril Woolf, Morristown, N. J., assignors to Allied Chemical & Dye Corporation, New York, N. Y., a corporation of New York No Drawing. Application February 15, 1956
Serial No. 565,530

9 Claims. (Cl. 260—653)

This invention relates to processes for manufacture of aliphatic perchlorofluorocarbon or perfluorocarbon compounds, particularly of high fluorine content.

Ordinarily, fluorinated aliphatic carbon compounds have been made by fluorinating chlorinated hydrocarbons by processes in which HF is utilized as the fluorinating agent. As is known in the art, some highly fluorinated products can be made only with great difficulty by the HF route, and other more highly fluorinated products cannot be made by use of HF as fluorinating agent. Elemental fluorine and chlorine trifluoride ($ClF_3$) are highly reactive and constitute fluorinating agents much more powerful than HF. However, fluorinating reactions involving use of elemental fluorine or chlorine trifluoride or mixtures of both are characterized by quick evolution of large quantities of heat, ignition and flaming which promote product decomposition often with explosive violence, with the result that the control of fluorinating reactions utilizing these materials as fluorinating agents is a major practical problem in the face of a rising demand for the more highly fluorinated products which can be made by the HF method only with great difficulty or not at all.

A major object of the present invention lies in the provision of processes for enriching the fluorine content of perchlorofluorocarbon compounds and for making more highly fluorinated saturated aliphatic perchlorofluorocarbon or perfluorocarbon compounds or mixtures thereof by procedures in which elemental fluorine or chlorine trifluoride or mixtures of both may be utilized as fluorinating agents, and by which the operational disadvantages arising out of the inherent high reactivity of elemental fluorine and chlorine trifluoride are overcome.

Practice of the invention involves catalytic reaction of certain organic perchlorofluorocarbon starting materials with elemental fluorine or chlorine trifluoride or mixtures of both as fluorinating agents to form fluorine enriched perchlorofluorocarbon or perfluorocarbon end products. In accordance with the invention, it has been found that certain crystallite $AlF_3$ catalysts have the properties of promoting reaction at lower temperatures without appreciable cleavage while effecting progressive fluorine enrichment, and that the conjunctive action of such properties and other procedural factors, particularly temperature regulation, provide smoothly operating gas-phase catalytic processes which may be readily controlled and carried out in conventional equipment.

The organic starting materials utilized in practice of the invention are aliphatic perchlorofluorocarbon compounds (i. e. compounds consisting of chlorine, fluorine and carbon) containing from 2 to 8 carbon atoms inclusive and containing at least one fluorine atom and at least one chlorine atom. Of the foregoing materials, more desirably, lower aliphatic compounds containing from 2 to 6 carbon atoms inclusive are employed, while in practice of the best embodiments starting compounds are those containing from 2 to 4 carbon atoms inclusive and preferably 3 to 4 carbon atoms. While these starting materials may be unsaturated, saturated compounds are preferred, and if the starting materials are unsaturated, suitable compounds should contain not more than one double bond. The invention is particularly applicable to the manufacture of perchlorofluorocarbons or perfluorocarbon compounds having such high fluorine content that fluorine cannot readily be incorporated by means of the usual HF fluorinating agent. Thus, more desirable starting materials are those containing at least three and preferably at least four fluorine atoms which may have been introduced by other lower cost processes with which this invention is not concerned.

The preferred saturated starting materials may be represented by the general formula $C_nF_pCl_{(2n+2-p)}$ in which $p$ is an integer less than $(2n+2)$; and $n$ is an integer between 2 and 8 inclusive. Unsaturated starting materials containing not more than one double bond may be represented by the general formula $C_nF_pCl_{(2n-p)}$ where $p$ and $n$ are as before. Typical examples of organic starting materials which may be utilized in accordance with the present improvements are perchlorofluoroethanes such as $$CClF_2CCl_2F, \; CF_3CCl_2F, \; CClF_2CClF_2$$

and $CF_3CClF_2$; perchlorofluoropropanes such as $$CF_3CCl_2CCl_2F, \; CF_3CCl_2CClF_2$$

and $CF_3CClFCClF_2$; and perchlorofluorobutanes such as $CF_3CFClCCl_2CF_3$, $CF_3CFClCFClCF_3$, $CF_3CF_2CFClCF_3$. Representative unsaturated perchlorofluorocarbon compounds containing not more than one double bond are $$CF_2=CCl_2, \; CF_2=CFCl, \; CClF_2CCl=CClF$$

$$CF_3CCl=CF_2, \; CF_3CF=CClCF_3, \; CF_3CCl=CClCF_3$$

and $$CF_3CF_2CCl=CF_2$$

Catalysts employed in accordance with the invention are substantially anhydrous aluminum fluoride ($AlF_3$) catalysts having crystallite size not substantially greater than about 500 Angstrom units radius and having been derived by reaction of aluminum chloride and HF.

Different types of aluminum fluorides are known. Generally such materials consists of lumps or smaller discrete particles which in turn are composed of $AlF_3$ crystals of relatively large size, i. e. not less than one thousand and usually several thousand Angstrom units radius and above, as in the case of aluminum fluorides commercially available on the market. However, certain forms of $AlF_3$, when examined even by the highest powered optical microscope, appear to be of noncrystalline or "amorphous" structure. When such "amorphous" aluminum fluorides are examined using X-ray diffraction technique, extremely small, sub-microscopic crystals, "crystallites," may be detected. In practice of this invention, such "amorphous" aluminum fluorides, having crystals of certain sub-microscopic (crystallite) size, are used to effect enriching fluorination of certain organic halogenated compounds. Enhanced catalytic activity may be had by use of aluminum fluorides of crystallite size of about 500 A. radius or below. As crystallite size decreases below this value, desired catalytic activity increases and particularly suitable aluminum fluorides include those having crystallite size of about 200 A. and below (as determined by X-ray diffraction technique).

The invention includes use of aluminum fluorides having the indicated crystallite size and catalytic activity regardless of method of preparation. However, catalytic material employed may be prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example, catalyst may be prepared by treating solid hydrated aluminum halide with gaseous fluorinating agent which is preferably but not necessarily anhydrous. For catalyst preparation, anhydrous HF is preferred, and anhydrous aluminum chloride is the preferred halide. Catalyst synthesis reaction is believed to proceed according to $3HF+AlCl_3=AlF_3+3HCl$. Reaction may be effected in a liquid or in a gas phase operation. The aluminum fluoride may be activated by heating in an anhydrous atmosphere at elevated temperature, e. g. heating the $AlF_3$ in a stream of dry nitrogen or HR gas for about one to four hours at temperatures of about 300–350° C. or four to six hours at 250–300° C. is ordinarily suitable for this purpose. Alternatively, the catalyst may be activated by heating the $AlF_3$ in a stream of free oxygen-containing gas such as oxygen or air at about 400–600° C. for approximately 30 minutes to six and one-half hours (depending mostly on the $O_2$ content of the treatment gas), in which case activation with dry nitrogen or HF gas as aforesaid, may be omitted. Also the catalyst may be conditioned by heating in an anhydrous atmosphere at temperatures of about 300–400° C. in the presence of elemental fluorine or $ClF_3$ to insure removal of any impurities reactive with those fluorinating agents.

The nature of the herein utilized $AlF_3$ catalysts and methods for making the same are more fully discussed and disclosed in U. S. Patent 2,681,267 of June 15, 1954. Examples A and B thereof specifically describe manufacture of $AlF_3$ by a liquid phase process and by a gas phase process, and Example 1 thereof illustrates activation by heat treatment with oxygen.

In practice of the invention, the organic starting materials described are ungraded or enriched as to fluorine content or converted to perfluorcarbon compounds by reacting such starting materials, under hereindescribed catalytic conditions with a fluorinating agent of the group consisting of elemental fluorine and chlorine trifluoride ($ClF_3$). Net effect of the reaction is to replace chlorine atoms present in the starting material with fluorine atoms with the result that free chlorine is liberated as a reaction by-product. Generally considered and particularly from stoichiometric aspects, overall reactions using saturated compounds as starting materials may be illustrated by the following:

(a) $C_nF_pCl_{(2n+2-p)}+r.F_2$
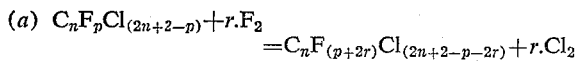
$=C_nF_{(p+2r)}Cl_{(2n+2-p-2r)}+r.Cl_2$ where $p$ is an integer less than $(2n+2)$; and $r$ is an integer such that $2r$ equals or is less than $(2n+2-p)$; and $n$ is an integer between 2 and 8 inclusively.

(b) $C_nF_pCl_{(2n+2p)}+x.ClF_3$
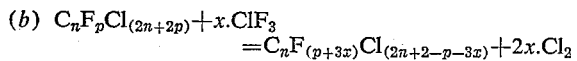
$=C_nF_{(p+3x)}Cl_{(2n+2-p-3x)}+2x.Cl_2$ where $x$ is an integer such that $3x$ equals or is less than $(2n+2-p)$.

For unsaturated starting materials containing not more than one double bond, overall reactions may be represented by the following:

(c) $C_nF_pCl_{(2n-p)}+r.F_2 \rightarrow$
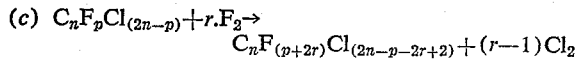
$C_nF_{(p+2r)}Cl_{(2n-p-2r+2)}+(r-1)Cl_2$ where $p$ is an integer less than $2n$; $r$ is an integer which is greater than 1 but equal to or less than $$\frac{2n-p+2}{2}$$

and $n$ is an integer between 2 and 8 inclusive.

(d) $C_nF_pCl_{(2n-p)}+x.ClF_3 \rightarrow$
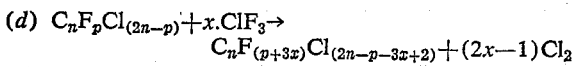
$C_nF_{(p+3x)}Cl_{(2n-p-3x+2)}+(2x-1)Cl_2$ where $x$ is an integer equal to or less than $(2n-p+2)$ and $3x$ is greater than 2.

In addition to utilization of the crystallite $AlF_3$ catalysts already described, a factor of major importance in successful practice of the invention is temperature control in the reaction zone. Thus, the temperature conditions described herein are of first importance in facilitating the carrying out of the reaction smoothly, without detrimental ignition or explosion, and in such a way as to avoid decompositions and obtain good yields of sought-for product.

In general, reaction temperatures are maintained at or above the level at which fluorination of the particular organic starting material begins to take place in the presence of the solid crystallite $AlF_3$ catalyst and gaseous elemental fluorine or gaseous $ClF_3$ or mixtures of both. Some fluorination may be effected at temperature not much above room temperature, while at about 50° C. fluorination is markedly notable, and about 100° C. is the preferred lower fluorination temperature. Acceptable yields of sought-for product may be obtained at temperatures as high as about 400° C., above which no advantages are obtained and product decomposition in some instances may become pronounced. In the better practice, maximum temperature of about 375° C. is preferred.

To obtain best yields and to insure smoothness of reaction and avoidance of incipient ignitions, reaction is preferably carried out so that a fore section, constituting a substantial portion of the total length of the reaction zone, is maintained at a relative low temperature ordinarily not in excess of about 250° C. The reaction zone as a whole may lie within a single reactor unit, or two physically separate reactors closely connected in series may be utilized. In a situation where the reaction zone is contained wholly in a single reactor unit, a substantial portion of the reactor near the inlet end thereof may be provided with a suitable external cooling means, while the subsequent section of the reactor unit toward the outlet end may be equipped with external heating means. For manufacturing convenience, preferably two separate reactor units may be employed. The first reactor may be equipped only with external cooling means, while the second reactor may be provided only with heating means designed to maintain desired temperatures in the second reactor. While reaction may be carried out with acceptable results in a single reactor unit maintained at temperatures falling anywhere within the above described range, e. g. a reactor in which temperatures are fairly constant throughout the length of the reaction zone, it is preferred, particularly to effect manufacture of perfluorocarbon products, to maintain a significant temperature gradient which is at a minimum at the inlet end of the reaction zone and at a maximum at approximately the exit end thereof. Considering the reaction zone as a whole, whether enveloped by a single reactor unit or carried out in stages in two or more series-connected reactors, it is preferred to effect temperature control of the overall reaction zone so that say the first fourth or third of the course or length of the total reaction zone be maintained at a temperature not in excess of about 250° C. Thus in a two stage reaction, the first stage of reaction should be held preferably at temperature below about 250° C. In this way the initial, the inherently most violent phase of reaction and preliminary fluorination are effected at lower temperatures which adequately prevent ignition and explosive tendencies and cleavage of the more unstable lower fluorine starting materials and while in the subsequent portion of the reaction zone, higher temperatures and higher fluorine concentrations if desired may be used to facilitate forcing displacement of the last more refractory chlorine atoms to form products which contain higher amounts of fluorine or are fully perfluorinated. Further, to facilitate temperature control and promote smooth reaction in the early phase of reaction, it is desirable to introduce the organic starting material and the fluorinating agent into the reactor through separate inlets.

Temperature also exerts a notable effect upon the composition of the perchlorofluorocarbon or perfluorocarbon produced. Higher temperatures tend to form products having a relatively greater proportion of fluorine in the molecule, whereas temperatures in the lower regions of the ranges indicated tend to favor formation of products having relatively lower proportions of fluorine in the molecule. Hence, in conjunction with other factors such as ratio of fluorinating agent to organic starting material and contact time, choice of specific reaction temperature may be determined according to the degree of fluorination of the product which is desired.

As indicated, the fluorinating agents utilized are elementary fluorine or chlorine trifluoride ($ClF_3$) or mixtures of both. The mol ratio of fluorinating agent to organic starting material is determined largely by the amount of fluorine wanted in the sought-for product, e. g. if a highly fluorinated product is desired and the starting material is originally of low fluorine content, correspondingly large amounts of fluorinating agent are introduced into the reaction zone with the starting material. In the case of saturated starting materials, theoretical requirements of fluorinating agent, whether as elementary fluorine or $ClF_3$, are one atom of fluorine per atom of chlorine to be displaced from the starting material. When unsaturated starting materials are employed, in addition to the foregoing there should be theoretically supplied to the reaction one mol of free fluorine for each unit of unsaturation (a double bond constituting a single unit of unsaturation).

Apart from strictly theoretical considerations, there should be supplied to the reaction zone as a whole a sufficient quantity of fluorinating agent to provide for any unsaturation of starting material. Preferably, the quantity of fluorinating agent utilized should be sufficient, in addition to providing for unsaturation requirements, to provide for a starting material chlorine displacement of magnitude sufficient to further fluorinate to some desired degree a substantial amount of the starting material. In other instances, where formation of substantial quantities of perfluorocarbon product is desired, the fluorinating agent should be present in quantity sufficient to provide, under the conditions of operation, for any unsaturation of the starting material and for displacement of all chlorine from at least a substantial amount of the starting material. In most commercial practice, it is preferred to work with a deficiency of fluorinating agent, utilizing for example not more than about 75% of total theoretical requirements. It has been found that such procedure, from practical considerations, brings about substantially complete utilization of fluorine or $ClF_3$, thus providing the advantages of minimizing consumption costs of these expensive fluorinating agents and also avoiding the necessity of recovering and recycling such difficulty handleable materials. Any unreacted starting materials may, of course, be readily recovered and recycled.

Another preferred expedient is the use of a relatively great deficiency of fluorinating agent in the initial stages of a reaction as a whole. For example, in the case of use of a single reactor unit, fluorinating agent feed may be split, introducing not more than about 50-70% of the total fluorinating agent to be used into the head end of the reaction zone along with the organic starting material, i. e. at the point where the tendency toward violent reaction is greatest, and then introducing the balance of the total fluorinating agent to be used into the reaction zone at a point say at or downstream of about one fourth or one third the total length of the reaction zone. In those situations where the reaction as a whole is carried out in two physically separate reactor units, the first portion of the fluorinating agent may be introduced into the first reactor, and the balance into the second reactor. This particular procedure makes possible the advantage of minimizing if desired the amount of fluorinating agent in the second phase of the reaction, thus conveniently permitting the use of high temperatures which may be employed to force the reaction to high or perfluorination without danger of reactivity sufficient to cause ignition and corresponding degradation of product. However, it will be understood that if the operational advantages afforded by use of deficiencies of fluorinating agent are of no particular consequence in a given operation, quantities of fluorinating agent employed may be in excess of theoretical requirements.

Time of contact of the mixture of organic starting material and fluorinating agent with the aluminum fluoride catalyst may be varied to some extent without noticeable sacrifice in advantageous high efficiency of operation. However, if contact time is excessive, i. e. at very low space velocities, the capacity of the reactor is disadvantageously low. On the other hand, if contact time is too short, i. e. at excessively high space velocities, the reaction of starting material to form desired product may be incomplete thereby entailing cost of recovering and recycling unreacted material to subsequent operation. Accordingly, the time of contact is determined by available facilities for temperature control, and by balancing the economic advantage of high reactor throughput obtained at short contact times against the cost of recovery of unreacted starting material. The reactions herein discussed are characterized in general by extreme rapidity. In commercial size procedures contact time may be in the range of 5-50 seconds; while in small scale operations, where facilities for flexible heat control are not readily available, contact time may be as high as 200 seconds. However, in any particular operation, rate of flow of reactants through the reaction zone is dependent upon variables such as scale of operation, quantity of catalyst in the reactor and specific apparatus employed, and may be best determined by test runs.

The herein described perchlorofluorocarbon starting materials may be employed singly or in any mixtures thereof. Source of such perchlorofluorocarbons is immaterial. These perchlorofluorocarbons may be obtained by known methods involving reaction of chlorinated hydrocarbons and HF, or may be obtained as the product or products of so-called jet type fluorination reaction in which hydrocarbons such as ethane, propane and butane are reacted with fluorine or $ClF_3$ in turbulent, venturi tube promoted high velocity jet reaction to form perchlorofluorocarbons of varying degrees of fluorination, e. g. the effluent of the jet reaction may be charged directly or shortly subsequently into a crystallite $AlF_3$ reaction zone. Thus, regardless of source of perchlorofluorocarbon starting materials, the invention involves the formation of a mixture comprising suitable perchlorofluorocarbon starting material and elemental fluorine or $ClF_3$ fluorinating agent, and heating such mixture in the presence of the herein described crystallite $AlF_3$ catalysts.

For convenience, atmospheric pressure operation is preferred, but the reaction may, if desired, be carried out at superatmospheric or subatmospheric pressure the choice of pressure being largely one of convenience, e. g. determined by the nature of the starting material employed.

Generally, the process of the invention is carried out by contacting the gaseous starting material with the aluminum fluoride catalysts described at temperature at which fluorination takes place in the presence of gaseous fluorine or $ClF_3$, the reactants being heated in the reaction zone at temperatures indicated for a time sufficient to fluorine upgrade a substantial amount of the starting material, withdrawing gaseous products from the zone and recovering said halocarbon from the gaseous products. Although not limited to continuous operations, the process of the invention may be advantageously carried out thereby. If desired for purposes of facility of temperature control, the reactants may be diluted with other gaseous material, e. g. an inert gas such as nitrogen, or recycle material richer in fluorine content than the starting material. Dilution may vary from none at all to the equivalent of diluent to $F_2$ ratio of 4:1.

Handling of the gaseous reaction zone exit and recovery of sought-for products therefrom may be more or less conventional. Thus, the reaction zone exit may be passed through KOH scrubbing solution which removes from the gas stream by-product chlorine and any possible traces of fluorine. The gas stream may then be dried by passage through any suitable drying agent such as calcium chloride, drierite (anhydrous calcium sulfate) or activated alumina. Thereafter, the dried gas stream may be passed through one or more condensers, e. g. a Dry Ice-acetone mixture trap and/or a liquid nitrogen trap, it being understood that the condensation facilities are chosen on the basis of the boiling points of any unreacted starting material and the boiling points of the sought-for fluorinated products. Individual compounds may be recovered, e. g. by distillation of condensates obtained. Unreacted starting material may be recycled to a subsequent operation.

Any suitable chamber or reactor tube constructed of inert material may be employed for carying out the reaction provided the total reaction zone afforded is of sufficient length and cross-sectional area to accommodate the required amount of aluminum fluoride necessary to provide adequate gas contact area, and at the same time afford sufficient free space for passage of the gas mixture at an economical rate of flow. Ordinarily, a reaction zone is fully packed with e. g. 4–20 mesh catalyst. Material such as nickel, Inconel and other materials resistant to fluorine and $ClF_3$ may be mentioned as suitable for use as reactor tubes.

The following examples illustrate practice of the invention, percentages being by moles. In these examples, the term "yield" equals the percent by moles of reacted starting material which is changed to sought-for product.

*Example 1.*—About 1100 grams of $AlF_3$ catalyst, prepared substantially in accordance with the procedure of Example B of U. S. Patent 2,681,267 of June 15, 1954, and treated with fluorine at temperature of 300–400° C. to remove any organic matter or other material reactive with fluorine, and having crystallite size not substantially greater than 200 Angstrom units radius, were charged into a 1½ inch I. D. nickel tube about 36 inches long. The reactor was provided with a thermocouple well extending axially substantially throughout its length. The catalyst granule size was in the range of about 4–20 mesh, and the free space of interior of the tube was substantially completely packed throughout its length. The organic starting material employed was $CF_3CCl_2CClF_2$, B. P. 72° C. Liquid $CF_3CCl_2CClF_2$ and elemental gaseous fluorine were introduced into the inlet end of the reactor thru separate inlets. No diluent was fed into the reactor. Rate of flow of elementary $F_2$ was about 0.42 mol/hr., and rate of flow of organic starting material was about 0.25 mol/hr., i. e. elemental fluorine to organic starting material mol ratio of about 1.7:1. About the first 3 inches of the reactor were encircled by a water-cooled copper coil, and the balance of the length of the tube was electrically externally heated to provide a maximum internal reactor temperature of about 360° C. A total of about 139 grams of $CF_3CCl_2CClF_2$ was fed into the reactor during a period of about 2.32 hours. Internal temperature in the reactor varied substantially progressively from about 110° C. at the inlet end to a maximum of about 360° C. a few inches from the exit end. By means of the cooling coil on the inlet end of the reactor, about the first third of the length of the reaction zone was held at internal temperature not above about 250–255° C. Contact time in the reactor was about 125 seconds. Reaction was smooth and without flame or explosion. The gaseous exit of the reactor was passed thru a rock salt (NaCl) packed tower which became moderately warm, indicating that a small amount of elemental fluorine had not reacted in the reactor and was being stripped out of the gas stream by the rock salt with corresponding release of chlorine from the NaCl. The gas stream discharged from the rock salt tower was scrubbed with a KOH solution to remove chlorine. After drying, by passage through Drierite, the gas stream was fed into a condenser trap cooled by a mixture of Dry Ice and acetone. Infrared curves taken before condensation identified $C_3F_8$ qualitatively. The condensate collected in the trap was fractionally distilled, and recoveries were as follows: a forerun of 5 grams having boiling point over a range of minus 45 to 41° C.; a sought-for fraction of 79 grams having a boiling point in the range of minus 38 to minus 37° C. showing a yield of about 81% of $C_3F_8$ (B. P. minus 37° C.). The still residue comprised 4 grams. Identification was confirmed by infrared examination and by molecular weight determination.

*Example 2.*—In this run the reactor, the crystallite $AlF_3$ catalyst, and the external cooling and heating facilities were the same as in above Example 1. However, the organic starting material employed was a mixture of 27 mol/percent $CF_3CCl_2CClF_2$ and 73%

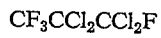
$$CF_3CCl_2CCl_2F$$

B. P. 112° C., the mixture having an average empirical formula of $C_3F_{4.27}Cl_{3.73}$ and a molecular weight of about 249. The organic starting material as liquid and elemental gaseous fluorine were introduced into the inlet end of the reactor thru separate inlets. At the start of the run diluting nitrogen was fed into the reactor thru a separate inlet in quantity equivalent to an $N_2:F_2$ ratio of about 1:1, and during the first 20 minutes of the run, the nitrogen supply was gradually decreased to zero. Rate of flow of elementary $F_2$ was about 0.32 mol/hr., and rate of flow of the mixture of organic starting material was about 0.20 mol/hr., i. e. elemental fluorine to organic starting material mixture mol ratio of about 1.6:1. A total of about 177 grams of the organic starting material mixture was fed into the reactor during a period of about 3.5 hours. At the start of the run and for about an hour thereafter, internal temperature of the reactor varied substantially progressively from about 60° C. at the inlet end to a maximum of about 345° C. a few inches from the exit end, and at about the end of the run internal temperature in the reactor varied substantially progressively from about 90° C. at the inlet end to a maximum of about 355° C. a few inches from the exit end. Internal temperature in about the first third of the reactor did not exceed about 245° C. Contact time in the reactor was about 160 seconds. Reaction both during the feed of the nitrogen diluent and after feed of the latter was shut off was smooth and without flame or explosion. The collection train consisted of a rock salt tower, four KOH scrubbers, one drying tower, and one Dry Ice-acetone cooled condenser followed by one condenser cooled by liquid nitrogen. In order to minimize amount of fluorine employed and effect complete consumption, the run was made with a smaller amount of fluorine than would be needed to theoretically convert all of the $C_3F_5Cl_3$ and $C_3F_4Cl_4$ to $C_3F_8$. The rock salt neither became warm nor lost weight. Total $Cl_2$ absorbed in the KOH scrubbers was at the rate of 0.32 mol/hr. which was equivalent to the $F_2$ feed rate. Infrared curves taken before condensation identified $C_3F_8$ and $i$-$C_3F_7Cl(CF_3CClFCF_3)$ qualitatively. The combined condensates collected in the traps were fractionally distilled, and recoveries were as follows: a forerun of 6 grams boiling over the range of minus 75° C. to minus 50° C.; a sought-for fraction of 63 grams having a boiling point of about minus 37° C. showing a yield of about 43% of $C_3F_8$; and a second sought-for fraction of 77 grams having a molecular weight of about 204 and boiling point of about minus 4° C. showing a yield of about 48% of i-C₃F₇Cl(CF₃CClFCF₃), B. P. minus 2° C. The still residue comprised 8 grams. Identification of products was confirmed by molecular weight determination and infrared examination.

*Example 3.*—In this run the reactor was a 1" I. D. nickel tube 40" long containing about 490 grams of crystallite AlF₃ catalyst, and no external cooling was used but heating facilities were the same as in above Example 1. The organic starting material employed was

CF₃CFClCCl₂CF₃

B. P. 97° C. The organic starting material as liquid and elemental gaseous fluorine were introduced into the inlet end of the reactor thru separate inlets. No diluting nitrogen was used at the start of the run. Rate of flow of elementary F₂ was about 0.38 mol/hr., and rate of flow of the organic starting material was about 0.25 mol/hr., i. e. elemental fluorine to organic starting material mol ratio of about 1.5 plus:1, a 2–3% excess of F₂. A total of about 245 grams of the organic starting material was fed into the reactor during a period of about 3.47 hours. At the start of the run, internal temperature of the reactor varied substantially progressively from about 60° C. at the inlet end to a maximum of about 380° C. a few inches from the exit end and reaction was smooth. During the second hour of the run, temperature about a third of the way from the inlet end rose locally to a hot spot of about 350° C. and ignition occurred. For the remainder of the run, about the first third of the reactor length was intermittently water-sprayed to hold maximum temperature in that section of the reactor in the range of about 200–250° C., and the reaction during the remainder of the run was smooth and without ignition tendency. Contact time in the reactor was about 58 seconds. The collection train comprised a rock salt tower, 3 KOH scrubbers, one drying tower, one Dry Ice-acetone cooled condenser followed by one condenser cooled by liquid nitrogen. Total Cl₂ absorbed in the KOH scrubbers was about 93 grams equivalent to the F₂ feed rate of 0.378 mol/hr. Infrared curves taken before condensation identified n-C₄F₁₀, C₂F₆ and CF₄ qualitatively. The combined condensates collected in the traps were fractionally distilled, and recoveries were as follows: a forerun of 31 grams boiling over the range of minus 78° C. to minus 10° C. containing C₂F₆ and CF₄; a sought-for fraction of 155 grams having a boiling point of about minus 2.5° C. showing a yield of about 76% of n-C₄F₁₀, B. P. minus 2° C., and a residue of 20 grams.

*Example 4.*—In this run the reactor, the crystallite AlF₃ catalyst, and the heating facilities were the same as in above Example 3. The organic starting material employed was CF₃CFClCCl₂CF₃. The organic starting material as liquid and elemental gaseous fluorine were introduced into the inlet end of the reactor thru separate inlets. Rate of flow of elementary F₂ was about 0.20 mol/hr., and rate of flow of the organic starting material was about 0.22 mol/hr., i .e. elemental fluorine to organic starting material mol ratio of about 0.9:1. A total of about 230 grams of the organic starting material was fed into the reactor during a period of about 3.6 hours. At the start of the run, internal temperature of the reactor varied substantially progressively from about 25° C. at the inlet end to a maximum of about 105° C. adjacent the exit end, and after about two hours and until about the end of the run internal temperature in the reactor varied substantially progressively from about 30° C. at the inlet end to a maximum of about 120° C. near the exit end. Throughout the run, temperature in the forepart of the reactor was, of course, well below 250° C. The low reactor temperatures indicated were maintained by limited heat input. Contact time in the reactor was about 145 seconds. Reaction throughout the run was smooth and without flame or explosion. The collection train consisted of two KOH scrubbers, one drying tower, and one Dry Ice-acetone cooled condenser. The condensates collected in the scrubbers and trap were fractionally distilled, and recoveries were as follows: a forerun of about 4 grams which did not contain C₄F₁₀; a sought-for fraction of about 106 grams having a boiling point of about 30° C. showing a yield of about 52% of CF₃CF₂CFClCF₃, B. P. about 30° C., and a second sought-for fraction of about 63 grams having a boiling point of about 63° C. showing yield of about 29% of C₄F₈Cl₂, B. P. about 63° C. The still residue comprised about 13 grams.

*Example 5.*—C₂H₆, ClF₃ and N₂ were separately introduced into the head end of a high evlocity, jet type reactor about 30" long, about 1.5" I. D. and having a water-cooled Venturi therein with its inlet end positioned close to the reactor inlet end, at rates of 0.45 mol/hr. of ClF₃, 0.1 mol/hr. of C₂H₆, and 0.5 mol/hr. of N₂. The hottest part of the reaction was at temperature of about 280° C. This jet reaction produced an exit reaction mixture comprising perchlorofluorocarbons along with HF, N₂ and Cl₂. The approximate molar composition of the perchlorofluorocarbon content of the reaction mixture was as follows: C₂F₅Cl 3%, and mixtures of isomers of each of C₂F₄Cl₂ 26%, C₂F₃Cl₃ 55% and C₂F₂Cl₄ 15%. The foregoing exit mixture of the jet reactor was passed immediately into the head end of a one-foot long 1" I. D. nickel reactor packed with about 150 grams of the crystallite AlF₃ catalyst of Example 1. The quantity of ClF₃ introduced into the jet reactor was in slight excess over that needed to convert all of the perchlorofluorocarbons entering the system to C₂F₆. The AlF₃ reactor was maintained at temperature of about 360° C. by external heating. Flow rates into the AlF₃ reactor were total perchlorofluorocarbon material, 0.10 mol/hr.; nitrogen 0.5 mol/hr.; HF 0.6 mol/hr.; chlorine 0.1 mol/hr. and residual ClF₃ from the jet reactor. Contact time in the AlF₃ reactor was about 8 seconds, and the run was continued for 3.33 hours. Reaction was smooth and without flame or explosion. The gaseous exit of the AlF₃ reactor was scrubbed with KOH solution to remove excess ClF₃, HF, and chlorine. After drying, the gas stream was fed into a condenser trap cooled by a mixture of Dry Ice and acetone and then thru a liquid nitrogen trap. Infrared curves taken before condensation identified CF₄, B. P. minus 128° C., CClF₂CF₃, B. P. minus 38° C., and CF₃CF₃, B. P. minus 78° C. qualitatively. The combined condensates collected in the traps were fractionally distilled, and recoveries were as follows: a forerun of about 2 grams (3% yield) of CF₄ containing a trace of CF₃CF₃; 36 grams (78% yield) of CF₃CF₃; and 10 grams (19% yield) of CClF₂CF₃. The still residue comprised 0.5 gram.

*Example 6.*—In this run the apparatus and catalyst were as in Example 3. The organic starting material employed was CF₂ClCFCl₂, B. P. 48° C. Liquid CF₂ClCFCl₂ and gaseous ClF₃ were introduced into the inlet end of the reactor thru separate inlets. Rate of flow of ClF₃ was about 0.25 mol/hr., rate of flow of organic starting material was about 0.25 mol/hr., i. e. ClF₃ to organic starting material mol ratio of about 1:1, and N₂ was used as diluent at flow rate of 0.5 mol/hr. About the first few inches of the reactor were air-cooled, and the balance of the length of the tube was electrically externally heated to provide a maximum internal reactor temperature of about 360° C. A total of about 174 grams of organic material was fed into the reactor during a period of about 3.7 hours. Internal temperature in the reactor varied substantially progressively from about 50° C. at the inlet end to a maximum of about 360° C. a few inches from the exit end. By means of air cooling, about the first third of the length of the reaction zone was held at internal temperature below 250–255° C. Contact time in the reactor was about 38 seconds. Reaction was smooth and without flame or explosion.

The gas stream discharged from the reactor was scrubbed with a KOH solution to remove chlorine. After drying, the gas stream was fed into a condenser trap cooled by a mixture of Dry Ice and acetone, followed by a liquid nitrogen trap. Infrared curves taken before condensation identified $C_2F_6$ and $C_2F_5Cl$ qualitatively. The combined condensates collected from the traps were fractionally distilled, and recoveries were as follows: a forerun of 7 grams, a sought-for fraction of 116 grams having a boiling point of about minus 79° C. showing a yield of about 78% of $C_2F_6$ (B. P. minus 79° C.); and 9 grams of $C_2F_5Cl$ (B. P. minus 38° C.). The still residue comprised 10 grams.

*Example 7.*—Catalyst and apparatus were as in Example 6. The organic starting material employed was $CF_3CCl=CClCF_3$, B. P. 67° C. Liquid starting material and gaseous fluorine were introduced into the inlet end of the reactor thru separate inlets. Rate of flow of elementary $F_2$ was about 0.5 mol/hr., and rate of flow of organic starting material was about 0.25 mol/hr., i. e. elemental fluorine to organic starting material mol ratio of about 2:1. About the first few inches of the reactor were air-cooled, and the balance of the length of the tube was electrically externally heated to provide a maximum internal reactor temperature of about 360° C. Internal temperature in the reactor varied substantially progressively from about 50° C. at the inlet end to a maximum of about 360° C. a few inches from the exit end. By means of air cooling, the first third of the length of the reaction zone was held at internal temperature below 200° C. Contact time in the reactor was about 21 seconds. Reaction was smooth and without flame or explosion. The gaseous exit of the reactor was scrubbed with a KOH solution to remove chlorine. After drying, the gas stream was fed into a condenser trap cooled by a mixture of Dry Ice and acetone. Infrared curves taken before condensation identified the product to be substantially all n–$C_4F_{10}$ without fission products.

*Example 8.*—$C_3H_8$, $ClF_3$ and $N_2$ were separately introduced into the head end of a high velocity, jet type reactor, similar to that of Example 5, at rates of 0.48 mol/hr. of $ClF_3$, 0.08 mol/hr. of $C_3H_8$, and 0.5 mol/hr. of $N_2$. Jet reactor operation was similar to that of Example 5. This jet reaction produced an exit reaction mixture comprising perchlorofluorocarbons along with HF, $N_2$ and $Cl_2$. The effluent mixture of the jet reaction was passed directly into the head end of a nickel reactor about 30″ long and 1⅜″ I. D., and packed with the crystallite $AlF_3$ catalyst of Example 1, the $AlF_3$ packed reaction section being in effect a continuation of the jet reaction section. The quantity of $ClF_3$ introduced into the jet reactor was in slight excess over that needed to convert all of the perchlorofluorocarbons entering the $AlF_3$ reactor to $C_3F_8$. Temperature in the $AlF_3$ reactor, maintained by external heating, was about 240° C. at the inlet and about 370° C. near the exit end. Reaction was smooth and without flame or explosion. The gaseous exit of the $AlF_3$ reactor was scrubbed with KOH solution to remove $ClF_3$, HF, and chlorine, and condensed after drying. Infrared curves taken before condensation identified $CF_4$, $CF_3Cl$, $C_2F_6$, $C_3F_8$ and $C_3F_7Cl$. On distillation of condensate, recoveries were as follows: a forerun of about 6 grams containing $CF_4$, $CF_3Cl$, and $C_2F_6$; 48 grams of $C_3F_8$; 14 grams of $C_3F_7Cl$; 12 grams of transition boiling between $C_3F_8$ and $C_3F_7Cl$; and 2 grams of residue.

We claim:

1. The process of enriching the fluorine content of an aliphatic perchlorofluorocarbon compound which comprises forming in a reaction zone a mixture of an aliphatic perchlorofluorocarbon compound starting material—containing from 2 to 8 carbon atoms and containing at least one fluorine atom and at least one chlorine atom—and a fluorinating agent of the group consisting of elemental fluorine and chlorine trifluoride, said agent being present in quantity sufficient to provide for any unsaturation of the starting material and for chlorine displacement therefrom, heating said mixture in said zone in the presence of a substantially anhydrous aluminum fluoride catalyst having crystallite size not substantially greater than about 500 Angstrom units radius and having been derived by reaction of aluminum chloride and HF, said heating being effected at fluorination temperature in the range of about 50–400° C. and for a time sufficient to further fluorinate a substantial amount of said starting material and to form gaseous reaction product comprising a saturated aliphatic perchlorofluorocarbon product compound containing from 2 to 8 carbon atoms and more fluorine than said starting compound, discharging said reaction product from said zone, and recovering from said reaction product saturated aliphatic perchlorofluorocarbon compound containing from 2 to 8 carbon atoms and more fluorine than said starting material.

2. The process of claim 1 in which a fore-section, constituting a substantial portion of the total length of the reaction zone, is maintained at fluorinating temperature not in excess of about 250° C., and the remainder of the reaction zone is maintained at a temperature in excess of 250° C.

3. The process of claim 1 in which a fore-section, constituting a substantial portion of the total length of the reaction zone, is maintained at fluorinating temperature not in excess of about 250° C. and the remainder of the reaction zone is maintained at a temperature in excess of 250° C., and not more than about 50–70% of the total fluorinating agent to be used is introduced into said fore-section, and the balance of the fluorinating agent is introduced into the reaction zone at a subsequent point.

4. The process of enriching the fluorine content of an aliphatic perchlorofluorocarbon compound which comprises forming in a reaction zone a mixture of an aliphatic perchlorofluorocarbon compound starting material—containing from 2 to 8 carbon atoms and containing at least one fluorine atom and at least one chlorine atom—and a fluorinating agent of the group consisting of elemental fluorine and chlorine trifluoride, said agent being present in quantity sufficient to provide for any unsaturation of the starting material and for displacement of all chlorine from a substantial amount of said starting material, heating said mixture in said zone in the presence of a substantially anhydrous aluminum fluoride catalyst having crystallite size not substantially greater than about 500 Angstrom units radius and having been derived by reaction of aluminum chloride and HF, said heating being effected at fluorination temperature in the range of about 50–400° C. and for a time sufficient to further fluorinate a substantial amount of said starting material and to form gaseous reaction product comprising a saturated aliphatic perfluorocarbon product compound containing from 2 to 8 carbon atoms, discharging said reaction product from said zone, and recovering from said reaction product saturated aliphatic perfluorocarbon compound containing from 2 to 8 carbon atoms.

5. The process of claim 4 in which the starting material contains at least three fluorine atoms, and a fore-section, constituting a substantial portion of the total length of the reaction zone, is maintained at fluorinating temperature not in excess of about 250° C. and the remainder of the reaction zone is maintained at a temperature in excess of 250° C.

6. The process of enriching the fluorine content of an aliphatic perchlorofluorocarbon compound which comprises forming in a reaction zone a mixture of an aliphatic percholorofluorocarbon compound starting material—containing from 2 to 4 carbon atoms and containing at least one fluorine atom and at least one chlorine atom—and a fluorinating agent of the group consisting of elemental fluorine and chlorine trifluoride, said agent being present in quantity sufficient to provide for any unsaturation of the starting material and for chlorine displacement therefrom, heating said mixture in said zone in the presence of a substantially anhydrous aluminum fluoride catalyst having crystallite size not substantially greater than about 500 Angstrom units radius and having been derived by reaction of aluminum chloride and HF, said heating being effected at fluorination temperature in the range of about 50–400° C. and for a time sufficient to further fluorinate a substantial amount of said starting material and to form gaseous reaction product comprising a saturated aliphatic perchlorofluorocarbon product compound containing from 2 to 4 carbon atoms and more fluorine than said starting compound, discharging said reaction product from said zone, and recovering from said reaction product saturated aliphatic perchlorofluorocarbon compound containing from 2 to 4 carbon atoms and more fluorine than said starting material.

7. The process of enriching the fluorine content of an aliphatic perchlorofluorocarbon compound which comprises forming in a reaction zone a mixture of an aliphatic percholorofluorocarbon compound starting material—containing from 2 to 4 carbon atoms and containing at least one fluorine atom and at least one chlorine atom—and a fluorinating agent of the group consisting of elemental fluorine and chlorine trifluoride, said agent being present in quantity sufficient to provide for any unsaturation of the starting material and for displacement of all chlorine from a substantial amount of said starting material, heating said mixture in said zone in the presence of a substantially anhydrous aluminum fluoride catalyst having crystallite size not substantially greater than about 500 Angstrom units radius and having been derived by reaction of aluminum chloride and HF, said heating being effected at fluorination temperature in the range of about 50–400° C. and for a time sufficient to further fluorinate a substantial amount of said starting material and to form gaseous reaction product comprising a saturated aliphatic perfluorocarbon product compound containing from 2 to 4 carbon atoms, discharging said reaction product from said zone, and recovering from said reaction product saturated aliphatic perfluorocarbon compound containing from 2 to 4 carbon atoms.

8. The process of claim 7 in which the starting material contains three to four carbon atoms and at least three fluorine atoms, and there is formed in the said reaction product and there is recovered therefrom material of the group consisting of $C_3F_8$ and n–$C_4F_{10}$.

9. The process of claim 7 in which the starting material contains at least three fluorine atoms; overall fluorinating temperature is in the range of about 100–375° C.; a fore-section, constituting a substantial portion of the total length of the reaction zone, is maintained at fluorinating temperature not in excess of about 250° C. and the remainder of the reaction zone is maintained at a temperature in excess of 250° C., and not more than about 50–70% of the total fluorinating agent to be used is introduced into said fore-section, and the balance of the fluorinating agent is introduced into the reaction zone at a subsequent point.

References Cited in the file of this patent

UNITED STATES PATENTS

| | | |
|---|---|---|
| 2,456,027 | Simons | Dec. 14, 1948 |
| 2,574,619 | Cady | Nov. 13, 1951 |
| 2,673,139 | Woolf et al. | Mar. 29, 1954 |
| 2,676,996 | Miller et al. | Apr. 27, 1954 |
| 2,702,306 | Gall et al. | Feb. 15, 1955 |
| 2,709,688 | Bandes et al. | May 31, 1955 |
| 2,748,177 | Miller et al. | May 29, 1956 |

OTHER REFERENCES

McBee et al.: Ind. and Eng. Chem., vol. 39, pp. 310–313 (March 1947).